(12) United States Patent
Li

(10) Patent No.: US 12,335,994 B2
(45) Date of Patent: Jun. 17, 2025

(54) RESOURCE COLLISION RESOLUTION METHOD AND APPARATUS

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 550 days.

(21) Appl. No.: 17/297,107

(22) PCT Filed: Nov. 29, 2018

(86) PCT No.: PCT/CN2018/118289
§ 371 (c)(1),
(2) Date: May 26, 2021

(87) PCT Pub. No.: WO2020/107349
PCT Pub. Date: Jun. 4, 2020

(65) Prior Publication Data
US 2022/0030598 A1    Jan. 27, 2022

(51) Int. Cl.
*H04W 72/56* (2023.01)
*H04W 72/0446* (2023.01)
*H04W 92/18* (2009.01)

(52) U.S. Cl.
CPC ....... *H04W 72/56* (2023.01); *H04W 72/0446* (2013.01); *H04W 92/18* (2013.01)

(58) Field of Classification Search
CPC ......... H04W 92/18; H04W 4/46; H04W 4/40; H04W 74/0808; H04W 72/56; H04W 24/10; H04W 28/26; H04W 72/25; H04W 72/542; H04W 4/44; H04W 72/40; H04W 28/0268; H04W 16/14; H04W 64/00; H04W 36/03; H04W 4/023;
(Continued)

(56) References Cited

U.S. PATENT DOCUMENTS

2016/0066337 A1* 3/2016 Sartori ............... H04W 76/14
370/329
2017/0019886 A1* 1/2017 Patel .................. H04W 72/23
(Continued)

FOREIGN PATENT DOCUMENTS

| CN | 106792885 A | 5/2017 |
| CN | 108616839 A | 10/2018 |
| WO | WO 2017190276 A1 | 11/2017 |

OTHER PUBLICATIONS

European Patent Application No. 18941315.6, Search and Opinion dated Jun. 2, 2022, 14 pages.
(Continued)

*Primary Examiner* — Kwasi Karikari
(74) *Attorney, Agent, or Firm* — Cozen O'Connor

(57) ABSTRACT

A resource collision resolution method and apparatus in a V2X direct link communication scene. A first device receives resource allocation information respectively sent by n second devices, where n is an integer greater than 1. The first device determines, according to the resource allocation information sent by the second device, resources allocated by the second device. When the resource allocated by a target second device in the n second devices meets a resource collision condition, the first device executes the resource collision resolution process.

11 Claims, 4 Drawing Sheets

(58) Field of Classification Search
CPC ............. H04W 52/146; H04W 74/002; H04W 28/0875; H04W 28/0967; H04W 28/0835; H04W 72/02; H04W 72/20; H04W 72/23; H04W 72/0446; H04W 88/04
See application file for complete search history.

(56) References Cited

U.S. PATENT DOCUMENTS

| | | |
|---|---|---|
| 2017/0071019 A1 | 3/2017 | Wakabayashi et al. |
| 2017/0188391 A1 | 6/2017 | Rajagopal et al. |
| 2018/0048994 A1 | 2/2018 | Kwon et al. |
| 2019/0254059 A1* | 8/2019 | Gulati ................. H04W 72/542 |
| 2020/0037132 A1* | 1/2020 | Wu ....................... H04W 76/14 |
| 2022/0303059 A1* | 9/2022 | Hahn .................... H04L 1/1896 |

OTHER PUBLICATIONS

CATT "Further discussion on resource allocation mechanism in PC5-based V2V"; 3GPP TSG RAN WG1 Meeting #83bis; R1-156605; Nov. 2015; 7 pages.
Indian Patent Application No. 202147029074, Office Action dated Mar. 11, 2022, 6 pages.

* cited by examiner

RESOURCE COLLISION RESOLUTION METHOD AND APPARATUS

This application is the US national phase application of International Application No. PCT/CN2018/118289, filed on Nov. 29, 2018, the entire contents of which are incorporated herein by reference.

TECHNICAL FIELD

The present disclosure relates to the field of communication technology, and particularly to a method and an apparatus for resource collision resolution in a V2X (Vehicle to Everything) direct communication scenario and a storage medium.

BACKGROUND

In the V2X technology, an on-board device may perform direct communication with other devices (such as other on-board devices, roadside infrastructure, etc.) through sidelink. Direct communication has characteristics of short delay and low overhead.

The direct communication scenario in LTE (Long Term Evolution) V2X technology does not support unicast and multicast communication, but only supports broadcast communication. For the direct communication scenario in 5G NR (New Radio) V2X technology, with increasing demand of new service, it is necessary to support unicast and multicast communication. With the functions of unicast and multicast, because resource allocation in the direct communication scenario can be independently allocated by the devices, the probability of resource collision increases drastically. For example, when two transmitting devices need to occupy the same resource to transmit information to the same receiving device, resource collision may occur.

At present, the main method to resolve resource collision is sensing, that is, before the transmitting devices transmits information, strengths of received signals on respective resource blocks are sensed. When the strength of the received signal on a certain resource block is higher than a predefined threshold, it indicates that the resource block has been occupied, and the transmitting devices no longer occupies the resource block to transmit information so as to avoid resource collision.

The above method can only detect the resource blocks being currently occupied, but cannot predict whether the resource blocks that need to be occupied in the future have resource collisions. For example, the first transmitting device has already planned to occupy the target resource block to transmit information to the receiving device at the target moment in the future, however, the second transmitting device senses that the target resource block is free when it is sensing at the current moment, so the second transmitting device also planned to occupy the target resource block to transmit information to the receiving device at the target moment. At this time, the two transmitting devices occupy the same resource block to transmit information to the same receiving device, and resource collision occurs.

Therefore, the method described above still cannot completely solve the problem of resource collision.

SUMMARY

According to a first aspect of the present disclosure, a method for resource collision resolution in a V2X direct communication scenario is provided. The method includes: receiving, by a first device, resource allocation information transmitted by n second devices respectively, wherein the resource allocation information is configured to indicate resources allocated by the second device for direct communication information transmitted between the first device and the second device, where n is an integer greater than 1; determining by the first device, the resources allocated by the second device based on the resource allocation information transmitted by the second device; and executing by the first device, a resource collision resolution process when the resources allocated by a target second device in the n second devices meet a resource collision condition, wherein the resource collision condition includes overlapping resources existing between the resources allocated by the target second device and the resources allocated by other second devices.

According to a second aspect of the present disclosure, a method for resource collision resolution in a V2X direct communication scenario is provided. The method includes: transmitting by a second device, resource allocation information to a first device, wherein the resource allocation information is configured to indicate resources allocated by the second device for direct communication information transmitted between the first device and the second device; and receiving by the second device, information transmitted by the first device when executing a resource collision resolution process, wherein the resource collision resolution process is executed when the resources allocated by the second device meet the resource collision condition, wherein the resource collision condition includes overlapping resources existing between the resources allocated by the second device and the resources allocated by other devices.

According to a third aspect of the present disclosure, an apparatus for resource collision resolution in a V2X direct communication scenario, applied to a first device, is provided. The apparatus includes: a processor; and a memory configured to store instructions executable by the processor; wherein the processor is configured to: receive resource allocation information transmitted by n second devices respectively, wherein the resource allocation information is configured to indicate resources allocated by the second device for direct communication information transmitted between the first device and the second device, where n is an integer greater than 1; determine the resources allocated by the second device based on the resource allocation information transmitted by the second device; and execute a resource collision resolution process when the resources allocated by a target second device in the n second devices meet a resource collision condition, wherein the resource collision condition includes overlapping resources existing between the resources allocated by the target second device and the resources allocated by other second devices.

According to a fourth aspect of the present disclosure, an apparatus for resource collision resolution in a V2X direct communication scenario, applied to a second device, is provided. The apparatus includes: a processor; and a memory configured to store instructions executable by the processor; wherein the processor is configured to: transmit resource allocation information to a first device, wherein the resource allocation information is configured to indicate resources allocated by the second device for direct communication information transmitted between the first device and the second device; and receive information transmitted by the first device when executing a resource collision resolution process, wherein the resource collision resolution process is executed when the resources allocated by the second device meet a resource collision condition, and the resource collision condition includes overlapping resources existing between the resources allocated by the second device and the resources allocated by other devices.

It should be understood that both the above general description and the following detailed description are exemplary and explanatory only and are not restrictive of the disclosure.

BRIEF DESCRIPTION OF THE DRAWINGS

The drawings herein are incorporated into the specification and constitute a part of the specification, show embodiments in conformity with the present disclosure, and explain the principle of the present disclosure together with the specification.

DETAILED DESCRIPTION

Reference will now be made in detail to embodiments, examples of which are illustrated in the accompanying drawings. When the following description refers to the accompanying drawings, the same numbers in different drawings represent the same or similar elements, unless otherwise represented. The implementations described in the following embodiments do not represent all implementations consistent with the present disclosure. On the contrary, they are only examples of devices and methods consistent with some aspects of the present disclosure as detailed in the appended claims.

The network architecture and business scenario in embodiments of the present disclosure is to explain the technical solutions of embodiments of the present disclosure more clearly, and does not constitute a limit to the technical solutions provided by the embodiments of the present disclosure. Those of ordinary skill in the art will know that with the evolution of network architecture and the emergence of new business scenarios, the technical solutions provided in the embodiments of the present disclosure are equally applicable to similar technical problems.

Figure 1:
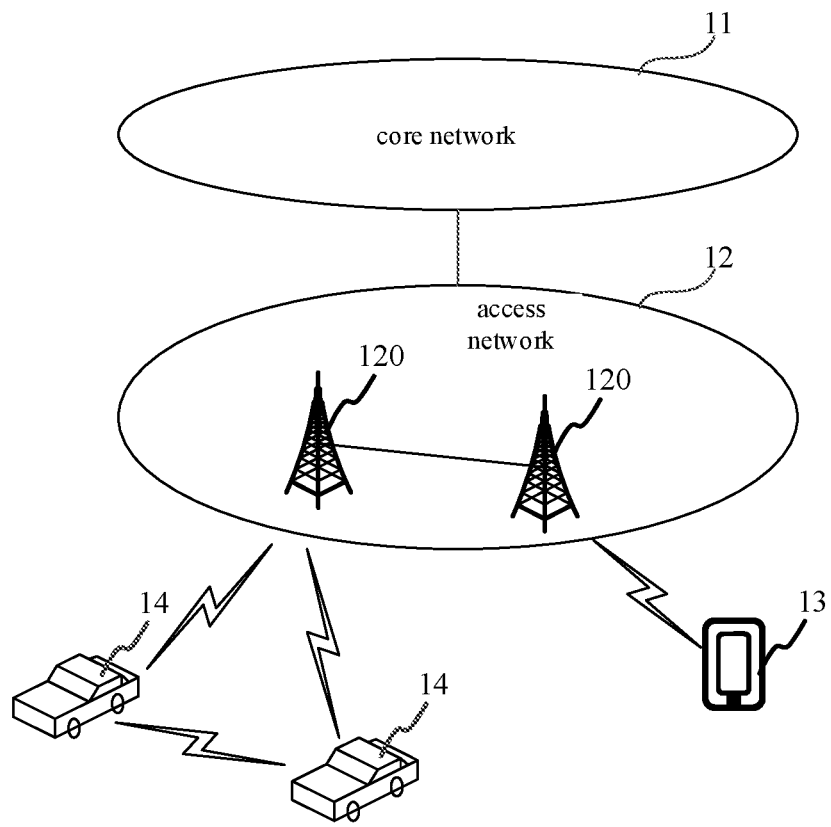
FIG. 1 is a schematic diagram of a network architecture, which may be applied to embodiments of the present disclosure.

FIG. 1 is a schematic diagram of a network architecture, which may be applied to embodiments of the present disclosure. The network architecture may be a network architecture of a C-V2X system. C refers to Cellular, and the C-V2X system is an on-board wireless communication system based on the evolution of cellular network communication systems such as 3G 4G or 5G The network architecture may include: a core network 11, an access network 12, a terminal 13, and a vehicle 14.

The core network 11 includes several core network devices. The function of the core network device is mainly to provide user connections, manage users and complete bearing of the services, and provide an interface to the external network as a bearer network. For example, the core network of the LTE (Long Term Evolution) system may include MME (Mobility Management Entity), S-GW (Serving Gateway), and P-GW (PDN Gateway) and other devices. The core network of the 5G NR system may include AMF (Access and Mobility Management Function) entities, UPF (User Plane Function) entities and SMF (Session Management Function) entities and other devices.

The access network 12 includes several access network devices 120. The access network device 120 and the core network device 110 communicate with each other through a certain air interface technology, such as the Si interface in the LTE system, and the NG interface in the 5G NR system. The access network device 120 may be a BS (Base Station), which is an apparatus employed in the access network and configured to provide wireless communication function to the terminal. The base station may include various forms of macro evolved NodeB, micro evolved NodeB, relay stations, access points and the like. In systems adopting different radio access technologies, the names of devices with base station functions may be different. For example, in LTE systems, the device is called eNodeB or eNB; in 5G NR systems, the device is called gNodeB or gNB. With the evolution of the communication technique, the name of "base station" may change. For the sake of easy description, in embodiments of the present disclosure, the above apparatuses that provides wireless communication for the terminal are collectively called access network device.

The terminal 13 may include various devices with wireless communication functions, such as handheld devices, on-board devices, wearable devices, computing device or other processing devices connected to a wireless modem, as well as various forms of User Equipment (UE), Mobile Station (MS), terminal device, etc. For the sake of easy description, the above devices are collectively called terminals. The access network device 120 and the terminal 13 communicate through some kind of air interface technologies, such as Uu interface.

The vehicle 14 may be an autonomous vehicle or a non-autonomous vehicle. The vehicle 14 is equipped with an on-board device, and the vehicle 14 realizes communication with other vehicles, terminal 13 and other devices, such as RSU (Road Side Unit), through the on-board device. The on-board device may also be called an on-board terminal, an on-board communication apparatus, or other names, which is not limited in the embodiments of the present disclosure. The on-board device may be an apparatus integrated in the on-board T-BOX (Telematics BOX), or may be an apparatus separate from the vehicle body. In addition, the on-board device may be installed in the vehicle 14 before the vehicle 14 leaves the factory, or may be installed in the vehicle 14 after the vehicle 14 leaves the factory.

The on-board device of the vehicle 14 and other devices (such as other on-board devices, terminal 13, RSU and the like) can communicate with each other through a direct communication interface (such as a PC5 interface). Accordingly, the communication link established based on the direct communication interface may be called a direct link or a sidelink. In addition, for the communication between the on-board device of the vehicle 14 and other devices, the access network 12 and the core network 11 may be used for transfer, that is, the communication link between the terminal 13 and the access network device 120 in the original cellular network is used for communication. Compared with the communication based on the Uu interface, the communication based on the direct communication interface has the characteristics of short delay and low overhead, which is suitable for communication between on-board device and other peripheral devices that are in the geographical proximity.

The above network architecture illustrated in FIG. 1 can implement V2X business scenarios. The above network architecture may also include devices such as RSUs, V2X application servers, and V2X control function nodes, which are not limited in embodiments of the present disclosure. In addition, the technical solutions described in embodiments of the present disclosure may be applied to 5G NR systems, and may also be applicable to subsequent evolution systems of 5G NR systems.

In embodiments of the present disclosure, for the direct communication scenario in the above V2X business scenario, a method for resource collision resolution is provided to solve the resource collision problem.

In embodiments of the present disclosure, the first device and the second device are devices at both ends of the direct communication in the V2X business scenario, and the sidelink may be established between the first device and the second device through a direct communication interface (such as a PC5 interface). The sidelink is used for interaction of user data and control signaling. For example, the first device may be an on-board device of the vehicle 14 in the network architecture illustrated in FIG. 1, and the second device may be an on-board device of another vehicle, or a terminal 13 or an RSU. For another example, the first device may be the terminal 13 in the network architecture illustrated in FIG. 1, and the second device may be other terminals, or an on-board device of the vehicle 14 or an RSU. In some embodiments, for the same device (for example, the same on-board device or the same terminal), it may be used as the first device in some scenarios, and may also be used as the second device in other scenarios.

Hereinafter, the technical solution of the present disclosure will be introduced and explained through several embodiments.

Figure 2:
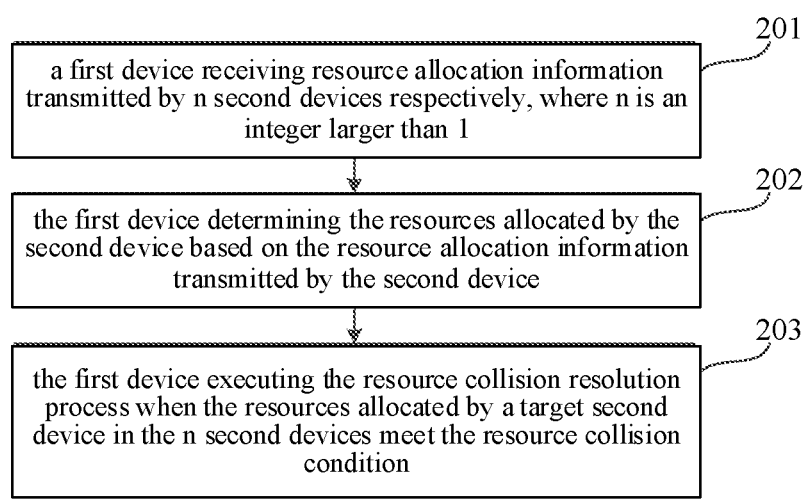
FIG. 2 is a flow chart illustrating a method for resource collision resolution in a V2X direct communication scenario according to an embodiment.

FIG. 2 is a flow chart illustrating a method for resource collision resolution in a V2X direct communication scenario according to an embodiment. This method is applied to the network architecture illustrated in FIG. 1. This method may include the following steps (201-203).

In step 201, the first device receives resource allocation information transmitted by each of n second devices, in which n is an integer greater than 1.

The resource allocation information is configured to indicate the resources allocated by the second device for direct communication information transmitted between the first device and the second device.

In an embodiment, the direct communication information includes information transmitted by the second device to the first device through a sidelink. For example, before the second device needs to transmit information to the first device through the sidelink, the second device first allocates resources for the information, and then transmits the resource allocation information to the first device to inform the first device of the resource which the second device plans to occupy for transmitting information to the first device.

In another embodiment, the direct communication information includes information transmitted by the first device to the second device through the sidelink. For example, before the first device needs to transmit information to the second device through the sidelink, the second device first allocates resources for the information, and then transmits resource allocation information to the first device to inform the first device of the resources allocated by the second device to the first device for transmitting the above information.

In embodiments of the present disclosure, the above resources allocated for direct communication information refer to wireless resources used when transmitting the direct communication information. Alternatively or additionally, the resource includes any one or a combination of the following: time domain resources, frequency domain resources, code domain resources, and space domain resources. The space domain resource may refer to the beam direction.

In addition, the above direct communication information may include control signaling and/or user data.

Alternatively or additionally, the resource allocation information includes identification information of the transmitting-end device and/or identification information of the receiving-end device. The transmitting-end device refers to the device that transmits the resource allocation information, that is, the second device; the receiving-end device refers to the device that receives the resource allocation information, that is, the first device.

In embodiments of the present disclosure, the identification information of a device is the information used to uniquely identify the device, and different devices have different identification information. For example, the identification information of the first device is used to uniquely identify the first device, and the identification information of the second device is used to uniquely identify the second device. The identification information of the first device is different from the identification information of the second device.

Alternatively or additionally, when the first device receives the resource allocation information, the first device detects whether the resource allocation information includes the identification information of the first device. When the resource allocation information includes the identification information of the first device, the first device confirms that the resource allocation information is transmitted to itself, and the first device performs subsequent processing on the resource allocation information. When the resource allocation information does not include the identification information of the first device, the first device confirms that the resource allocation information is not transmitted to itself, and the first device does not perform subsequent processing on the resource allocation information, for example, discards the resource allocation information. In addition, after receiving the resource allocation information, the first device may also determine which transmitting-end device transmits the resource allocation information according to the identification information of the transmitting-end device carried in the resource allocation information.

Alternatively or additionally, the resource allocation information is transmitted in the form of SCI (Sidelink Control Information).

In step 202, the first device determines the resources allocated by the second device based on the resource allocation information transmitted by the second device.

Taking the target second device among the above n second devices as an example, the first device determines the resources allocated by the target second device for direct communication information transmitted between the target second device and the first device according to the resource allocation information transmitted by the target second device.

The target second device may be any one of the above n second devices.

Alternatively or additionally, for each second device among the n second devices, the first device determines the resources allocated by the second device according to resource allocation information transmitted by the second device.

In step 203, when the resources allocated by the target second device among the n second devices meet the resource collision condition, the first device executes the resource collision resolution process.

The resource collision condition refers to a pre-set condition that is determined as having a resource collision. Alternatively or additionally, the resource collision condition includes: there being overlapping resources between the resources allocated by the target second device and the resources allocated by other second devices. The overlapping resource refers to the same resource.

For example, when the resources include time domain resources and frequency domain resources, and when the time domain resources allocated by the target second device and the time domain resources allocated by another second device have the same time domain resources, and there are the same frequency domain resources between the frequency domain resources allocated by the target second device and the frequency domain resources allocated by the other second device, it indicates that there are overlapping resources, which meet the resource collision condition.

For another example, when the resources include the time, frequency, code domain and space domain (that is, the time domain resources, frequency domain resources, code domain resources, and space domain resources introduced above), and there are the same time, frequency, code and space resources between the time, frequency code and space domain resources allocated by the target second device and the time, frequency, code and space domain resources allocated by another second device, it indicates that there are overlapping resources, which meet the resource collision condition. The above same time, frequency, code and space domain resources mean that the time domain resources, frequency domain resources, code domain resources, and space domain resources are all the same, and as long as one item is different, there is no overlap.

Alternatively or additionally, the resource collision condition further includes: the proportion of the overlapping resources in resources allocated by the target second device and/or the proportion of the overlapping resources in resources allocated by the other second devices being greater than the threshold. The threshold can be predefined in standards or protocols, or indicated by the base station. In embodiments of the present disclosure, the value of the threshold is not limited, and exemplarily, the threshold is 5%, 10%, or 15%.

Figure 3:
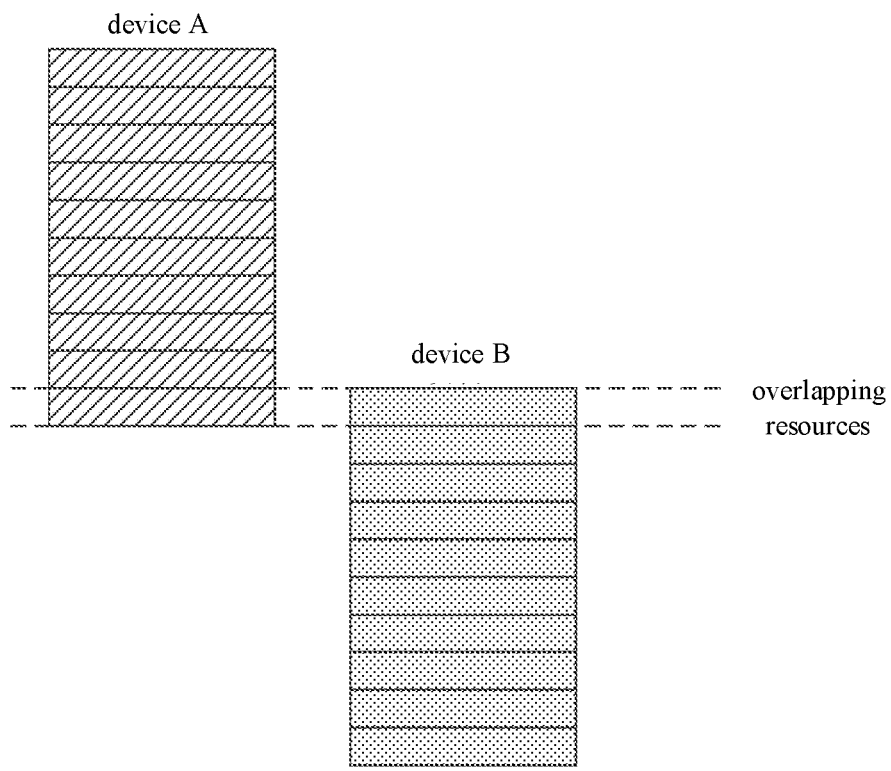
FIG. 3 is a schematic diagram illustrating a resource overlapping according to an embodiment.
Figure 4:
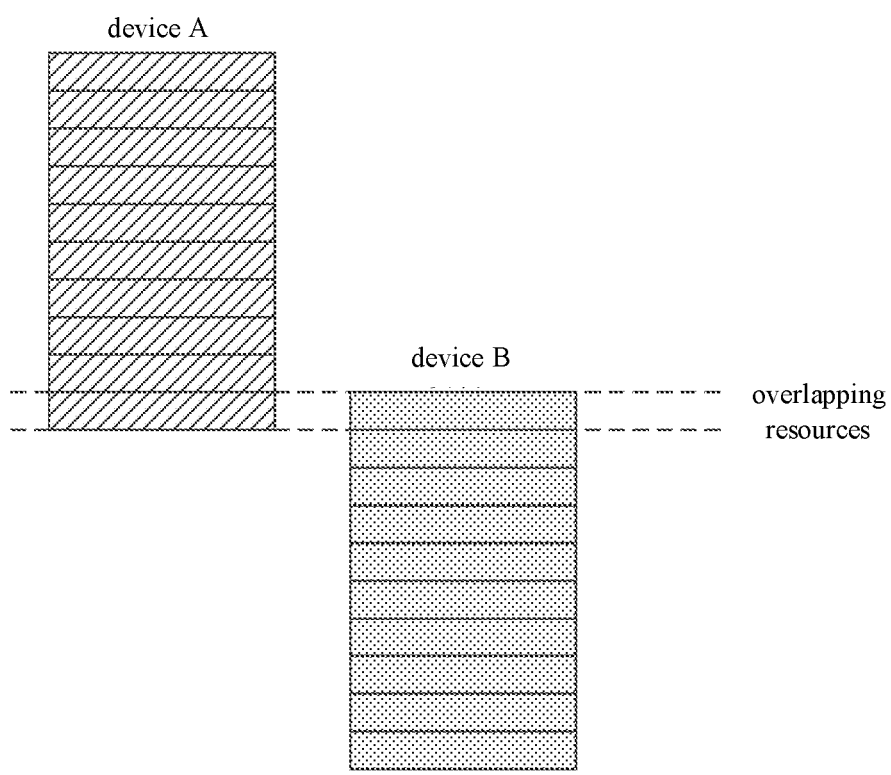
FIG. 4 is a schematic diagram illustrating another resource overlapping according to an embodiment.

Exemplarily, referring to FIG. 3 and FIG. 4 in combination, it is assumed that, in the resources allocated by the device A and the device B, the time domain resources are completely the same, and there are overlaps in the frequency domain resources. As illustrated in FIG. 3, the frequency domain resources only overlap a small part. For example, the overlapping resources account for 10% of the resources allocated by the device A and the device B, and the threshold is 15%, then it is determined that device A and device B do not meet the resource collision condition. As illustrated in FIG. 4, there are lots of overlaps in the frequency domain resources. For example, the overlapping resources account for 50% of the resources allocated by the device A and the device B, and the threshold is 15%, then it is determined that device A and device B meet the resource collision condition.

When the resources allocated by the target second device meet the resource collision condition, the first device executes the resource collision resolution process. The resource collision resolution process refers to the operation process to solve the resource collision problem and avoid resource collision. In embodiments of the present disclosure, several resource collision resolution processes are provided. For details, please refer to the introduction and description in the embodiments below.

In addition, when the resources allocated by the target second device do not meet the resource collision condition, the direct communication information is still transmitted according to the resources allocated by the target second device.

It is to be noted that as long as the resource collision condition is met between the target second device and any other second device among the n second devices, the first device needs to execute the resource collision resolution process to solve the resource collision problem.

It is also to be noted that in case that there is only a small amount of overlapping resources between the target second device and other second devices, the resource collision resolution process may be not executed, and the direct connection information is still transmitted according to the resources allocated by the target second device. This is because, even if the direct communication information transmitted on this small part of overlapping resources cannot be successfully received, the direct communication information transmitted on overlapping resources of this part can also be correctly decoded according to the direct communication information transmitted on other non-overlapping resources.

In summary, in the technical solutions provided by the embodiments of the present disclosure, resource allocation information transmitted by each second device is received by the first device, and whether there is a target second device meeting the resource collision condition is detected according to the resource allocation information. When there is a target second device meeting the resource collision condition, the first device executes the resource collision resolution process so as to solve the resource collision problem. With the above method, for the resources that are planned to be occupied in the future in the V2X direct communication scenario, whether there will be a resource collision can be detected, improving the resolution probability of the resource collision and avoiding the occurrence of resource collision to the utmost extent, fully ensuring the success rate of transmitting and receiving information in the V2X direct communication scenario, and facilitating to improve spectrum efficiency.

Figure 5:
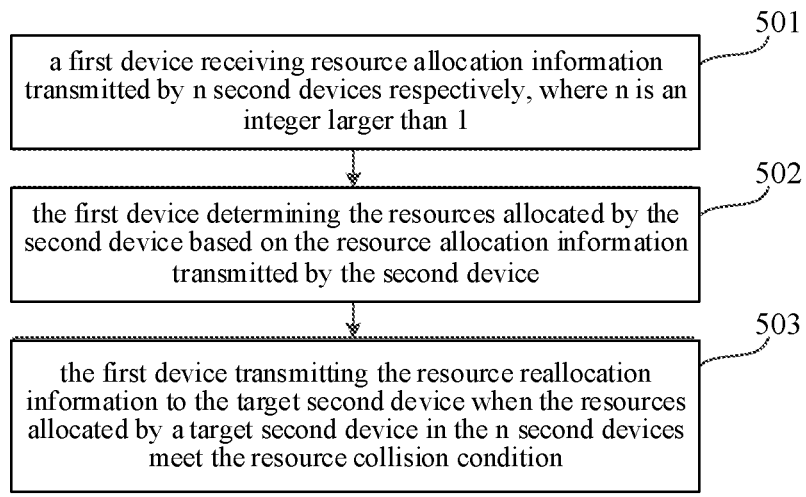
FIG. 5 is a flow chart illustrating a method for resource collision resolution in a V2X direct communication scenario according to another embodiment.

FIG. 5 is a flow chart illustrating a method for resource collision resolution in a V2X direct communication scenario according to another embodiment. This method may be applied to the network architecture illustrated in FIG. 1. This method may include the following steps (501-503).

In step 501, the first device receives resource allocation information transmitted by each of then second devices, in which n is an integer greater than 1.

In step 502, the first device determines the resources allocated by the second device based on the resource allocation information transmitted by the second device.

The above steps 501-502 are the same as the steps 201-202 in the embodiment of FIG. 2, please refer to the introduction and description in the embodiment of FIG. 2, which will not be elaborated in this embodiment.

In step 503, when the resources allocated by the target second device among the n second devices meet the resource collision condition, the first device transmits resource reallocation information to the target second device.

The resource reallocation information is configured to instruct the target second device to reallocate resources. Alternatively or additionally, the resource reallocation information is transmitted in the form of SCI on PSCCH (Pysical Sidelink Control Channel), or in the form of SFCI (Sidelink Feedback Control Information) on PSFCH (Pysical Sidelink Feedback Channel).

Alternatively or additionally, the resource reallocation information includes identification information of the overlapping resources. The identification information of the overlapping resources is used to uniquely indicate the overlapping resource. The identification information of the overlapping resource may be represented by the identification allocated to the resource, or the identification allocated to the information transmitted by the overlapping resource. Exemplarily, when the overlapping resources are used to transmit data, the identification information of the overlapping resources may be the ID (Identity) of the time-frequency resource block occupied by the data; when the overlapping resources are used to transmit the reference signal, the identification information of the overlapping resources may be the ID of the reference signal; when the overlapping resources are used to transmit the PSCCH or PSFCH resource, the identification information of the overlapping resources may be the ID of the time-frequency resource block occupied by the PSCCH or PSFCH resource, or may also be the ID of the PSCCH or PSFCH resource.

In addition, after the target second device receives the resource reallocation information transmitted by the first device, the target second device reallocates resources for the direct communication information transmitted between the target second device and the first device. The target second device may reallocate resources for the direct communication information transmitted by all the previously allocated resources; or, the target second device may also determine overlapping resources among all the resources in the previous allocation based on the identification information of the overlapping resources contained in the resource reallocation information, and reallocate resources for the direct communication information transmitted by the overlapping resources. The target second device may also notify the first device of the reallocated resources through resource allocation information.

Alternatively or additionally, before step 503, the following step is further included. When the resources allocated by the target second device meet the resource collision condition, the first device detects whether the target second device meets the resource reallocation condition. When the target second device meets the resource reallocation condition, the first device executes the above step 503 and transmits resource reallocation information to the target second device. The resource reallocation condition refers to a preset condition that requires resource reallocation.

Alternatively or additionally, the resource reallocation condition includes but is not limited to any one or a combination of the following.

1. The proportion of the overlapping resource in resources allocated by the target second device is larger than the proportion of the overlapping resource in resources allocated by the other second devices.

That is, the larger the proportion of overlapping resources in the resources allocated by the second device is, the higher the priority of transmitting the resource reallocation information to the second device is. For example, when there are overlapping resources between device A and device B, and the overlapping resources account for 50% of the resources allocated by device A and 20% of the resources allocated by device B, then the resource reallocation information is firstly transmitted to device A.

2. The starting time of the time domain resources allocated by the target second device is later than the starting time of the time domain resources allocated by the other second devices.

That is, the later the starting time of the time domain resource in the resources allocated by the second device is, the higher the priority of transmitting the resource reallocation information to the second device is. For example, the time domain resources allocated by device A for communication with the first device is t~t+3, and the time domain resources allocated by device B for communication with the first device is t+2~t+4, but the frequency domain resources are the same. Therefore, device A and device B have overlapping resources. Because the starting time of the time domain resources allocated by the device A is t, and the starting time of the time domain resources allocated by the device B is t+2, the first device firstly transmits the resource reallocation information to the device B.

It is to be noted that before the first device transmits the resource reallocation information to the target second device, it may firstly detect whether the time interval between the starting time of the time domain resources allocated by the target second device and the current time is greater than a preset duration. When the time interval is greater than the preset duration, the step of transmitting resource reallocation information to the target second device is executed, and when the time interval is less than the preset duration, the step of transmitting resource reallocation information to the target second device is not executed. The above preset duration may be pre-defined in standards or protocols, or indicated by the base station. When the above time interval is too short, even if the first device transmits resource reallocation information to the target second device, the target second device cannot successfully receive the resource reallocation information before transmitting the direct communication information to the first device. Therefore, in order to avoid performing unnecessary operations, the above detection mechanism may be performed before the resource reallocation information is transmitted.

3. The priority of the direct communication information transmitted by the resources allocated by the target second device is lower than the priority of the direct communication information transmitted by the resources allocated by the other second devices.

That is, the lower the priority of the direct communication information transmitted by the resources allocated by the second device, the higher the priority of transmitting the resource reallocation information to the second device. The priority of the direct communication information can be set according to the delay requirement of the direct communication information. For example, the higher the delay requirement of the direct communication information is, the higher the priority is; on the contrary, the lower the delay requirement of the direct communication information is, the lower the priority is. For example, the time delay requirement of the direct communication information A transmitted by the resources allocated by the device A is less than 5 ms, and the time delay requirement of the direct communication information B transmitted by the resources allocated by the device B is less than 10 ms, then the time delay requirement of the direct communication information A is higher, the priority of the direct communication information A is higher, and the resource reallocation information is firstly transmitted to the device B.

It is to be noted that when the resource allocation information indicates the resources allocated by the second device for the information transmitted to the first device, or when the resource allocation information indicates the resources allocated by the second device for the information transmitted to the first device, the technical solutions provided in the embodiments are applicable.

In summary, in the technical solutions provided in the embodiments, when the first device detects that the resources allocated by the target second device meet the resource collision condition, it transmits resource reallocation information to the target second device, so that the target second device can reallocate resources according to the resource reallocation information, thereby avoiding resource collisions.

In addition, when the resource allocation information indicates the resources allocated by the second device for the information transmitted by the first device, the first device may also execute the resource collision resolution process in the following method to solve the resource collision problem.

In a possible implementation, when the priority of the target direct communication information that the first device needs to transmit to the target second device is higher than the priority of other direct communication information that the first device needs to transmit to the other second devices, the first device only transmits the target direct communication information to the target second device on the overlapping resources.

For example, when two second devices schedule the same resource for the first device to transmit direct communication information, the first device compares the priority of the direct communication information transmitted to the two second devices on the overlapping resources. The first device transmits direct communication information to only one of the second devices (that is, the second device with a higher priority of direct communication information) on the overlapping resources, and no longer transmits direct communication information to the other second device (that is, the second device with a lower priority of the direct communication information) on the overlapping resources.

The priority of the direct communication information may be set according to the delay requirement of the direct communication information. For example, the higher the delay requirement of the direct communication information is, the higher the priority is; on the contrary, the lower the delay requirement of the direct communication information is, the lower the priority is. For example, HARQ (Hybrid Automatic Repeat Request) feedback has a higher priority than CSI (Channel State Information) feedback, and the priority of the aperiodic CSI feedback is higher than the priority of the periodic CSI feedback, and the like. Or, the priority may be set according to the delay priority of different information in on-board communication, such as the delay priority of safety-related information is higher than the delay priority of traffic efficiency-related information, and higher than the delay priority of entertainment-related information.

In another possible implementation, the first device transmits multiplexed information. The multiplexed information includes: target direct communication information that the first device needs to transmit to the target second device, other direct communication information that the first device needs to transmit to the other second devices, and identification information of the target second device and the other second devices.

For example, when two second devices schedule the same resource for the first device to transmit direct communication information, the first device will perform multiplexing on the direct communication information transmitted to the two second devices on the overlapping resources to generate multiplexed information, and then transmit the multiplexed information on the overlapping resources. For example, when the first device does not have sufficient time to transmit the resource reallocation information to the two second devices, the first device may use this method to transmit the multiplexed information on the overlapping resources. Since the multiplexed information includes the identification information of each receiving-end device, after a certain device receives the multiplexed information, it can detect whether the multiplexed information includes its own identification information. When the multiplexed information includes its own identification information, the device decodes and obtains the information transmitted to itself.

It is to be noted that the direct communication information transmitted by the resources scheduled by by the second device for the first device may be the direct communication information transmitted through PSCCH or PSFCH, such as CSI feedback, HARQ feedback, and the like, or the direct communication information transmitted through PSSCH (Pysical Sidelink Share Channel), such as CSI feedback, HARQ feedback, data, and the like.

In summary, the two methods provided in the embodiments may also solve the resource collision problem.

Figure 6:
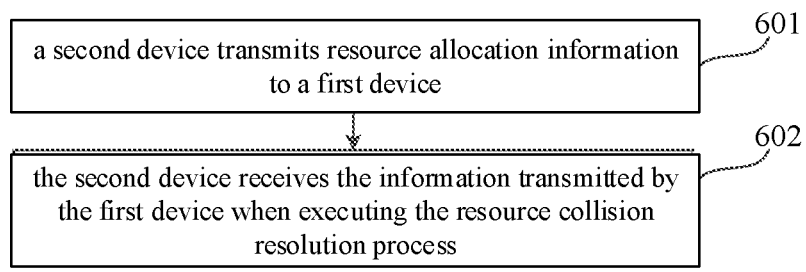
FIG. 6 is a flow chart illustrating a method for resource collision resolution in a V2X direct communication scenario according to another embodiment.

FIG. 6 is a flow chart illustrating a method for resource collision resolution in a V2X direct communication scenario according to another embodiment. This method may be applied to the network architecture illustrated in FIG. 1. This method may include the following steps (601-602).

In step 601, the second device transmits the resource allocation information to the first device.

The resource allocation information is configured to indicate the resources allocated by the second device for direct communication information transmitted between the first device and the second device.

Alternatively or additionally, the direct communication information includes information transmitted by the second device to the first device through a sidelink; or, the direct communication information includes information transmitted by the first device to the second device through a sidelink.

In step 602, the second device receives the information transmitted by the first device when executing the resource collision resolution process.

The resource collision resolution process is executed when the resources allocated by the second device meet the resource collision condition. The resource collision condition includes: there being overlapping resources between the resources allocated by the second device and the resources allocated by other devices. Alternatively or additionally, the resource collision condition further includes: the proportion of the overlapping resources in resources allocated by the target second device and/or the proportion of the overlapping resources in resources allocated by the other second devices being greater than the threshold.

In an example, step 602 includes the following. The second device receives the resource reallocation information transmitted by the first device, in which the resource reallocation information is configured to instruct the second device to reallocate resources. Alternatively or additionally, the resource reallocation information includes identification information of the overlapping resources. After receiving the resource reallocation information transmitted by the first device, the second device reallocates resources for the direct communication information transmitted between the second device and the first device. The second device may reallocate resources for the direct communication information transmitted by all previously allocated resources; or, the second device may also determine overlapping resources among all the resources in the previous allocation based on the identification information of the overlapping resources contained in the resource reallocation information, and reallocate resources for the direct communication information transmitted by the overlapping resources. In addition, the second device may also notify the first device of the re-allocated resources through resource allocation information.

In another example, step 602 includes the following. When the priority of the target direct communication information to be transmitted by the first device to the target second device is higher than the priority of other direct communication information to be transmitted by the first device to the other devices, the second device receives the target direct communication information transmitted by the first device only to the target second device on the overlapping resources.

In another example, step 602 includes the following. The second device receives the multiplexed information transmitted by the first device. The multiplexed information includes: target direct communication information to be transmitted by the first device to the target second device, other direct communication information to be transmitted by the first device to the other second devices, and identification information of the second device and the other devices.

It is to be noted that "the second device" involved in the embodiments may be "the target second device" in the other embodiments above. For details not disclosed in the embodiments, please refer to the introduction and description in other embodiments above.

In summary, in the technical solutions provided by the embodiments of the present disclosure, resource allocation information transmitted by each second device is received by the first device, and whether there is a target second device meeting the resource collision condition is detected according to the resource allocation information. When there is a target second device meeting the resource collision condition, the first device executes the resource collision solution process so as to solve the resource collision problem. With the above method, for the resources that are occupied in the future plan in the V2X direct communication scenario, whether there will be a resource collision can be detected, improving the resolution probability of the resource collision and avoiding the occurrence of resource collision to the utmost extent, fully ensuring the success rate of transmitting and receiving information in the V2X direct communication scenario, and facilitating to improve spectrum efficiency.

The following are apparatus embodiments of the present disclosure, which may be used to implement the method embodiments of the present disclosure. For details that are not disclosed in the apparatus embodiments of the present disclosure, please refer to the method embodiments of the present disclosure.

Figure 7:
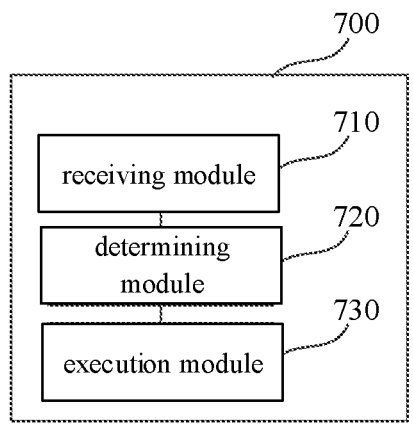
FIG. 7 is a block diagram illustrating an apparatus for resource collision resolution in a V2X direct communication scenario according to an embodiment.

FIG. 7 is a block diagram illustrating an apparatus for resource collision resolution in a V2X direct communication scenario according to an embodiment. The apparatus has the function of realizing the above method embodiments on the first device side, and the function may be realized by hardware, or by hardware executing corresponding software. The apparatus 700 may conclude a receiving module 710, a determining module 720 and an execution module 730.

The receiving module 710 is configured to receive resource allocation information transmitted by n second devices respectively, in which the resource allocation information is configured to indicate the resources allocated by the second device for direct communication information transmitted between the first device and the second device, in which n is an integer greater than 1.

The determining module 720 is configured to determine the resources allocated by the second device based on the resource allocation information transmitted by the second device.

The execution module 730 is configured to execute the resource collision resolution process when the resources allocated by a target second device in the n second devices meet the resource collision condition, in which the resource collision condition includes there being overlapping resources between the resources allocated by the target second device and the resources allocated by other second devices.

In summary, in the technical solutions provided by the embodiments of the present disclosure, resource allocation information transmitted by each second device is received by the first device, and whether there is a target second device meeting the resource collision condition is detected according to the resource allocation information. When there is a target second device meeting the resource collision condition, the first device executes the resource collision solution process so as to solve the resource collision problem. With the above method, for the resources that are planned to be occupied in the future in the V2X direct communication scenario, whether there will be a resource collision can be detected, improving the resolution probability of the resource collision and avoiding the occurrence of resource collision to the utmost extent, fully ensuring the success rate of transmitting and receiving information in the V2X direct communication scenario, and facilitating to improve spectrum efficiency.

Alternatively or additionally, the resource collision condition further includes: the proportion of the overlapping resources in resources allocated by the target second device and/or the proportion of the overlapping resources in resources allocated by the other second devices being greater than the threshold.

Alternatively or additionally, the execution module 730 includes a first transmitting submodule. The first transmitting submodule is configured to transmit resource reallocation information to the target second device, in which the resource reallocation information is configured to instruct the target second device to reallocate resources.

Alternatively or additionally, the execution module 730 further includes a detecting submodule. The detecting submodule is configured to detect whether the target second device meets the resource reallocation condition when the resources allocated by the target second device meet the resource collision condition, in which the resource reallocation condition refers to a preset condition that requires resource reallocation. The first transmitting submodule is configured to transmit the resource reallocation information to the target second device when the target second device meets the resource reallocation condition.

Alternatively or additionally, the resource reallocation condition includes any one or a combination of the following: the proportion of the overlapping resources in resources allocated by the target second device being larger than the proportion of the overlapping resources in resources allocated by the other second devices; the starting time of the time domain resources allocated by the target second device being later than the starting time of the time domain resources allocated by the other second devices; and the priority of the direct communication information transmitted by the resources allocated by the target second device being lower than the priority of the direct communication information transmitted by the resources allocated by the other second devices.

Alternatively or additionally, the resource reallocation information includes identification information of the overlapping resources.

Alternatively or additionally, the direct communication information includes information transmitted by the second device to the first device through a sidelink.

Alternatively or additionally, the direct communication information includes information transmitted by the first device to the second device through a sidelink.

Alternatively or additionally, the execution module 730 includes a second transmitting submodule. The second transmitting submodule is configured to transmit the target direct communication information to the target second device on the overlapping resources when the priority of the target direct communication information to be transmitted by the first device to the target second device is higher than the priority of other direct communication information to be transmitted by the first device to the other second devices.

Alternatively or additionally, the execution module 730 includes a third transmitting submodule. The third transmitting submodule is configured to transmit multiplexed information, in which, the multiplexed information includes: target direct communication information to be transmitted by the first device to the target second device, other direct communication information to be transmitted by the first device to the other second devices, and identification information of the target second device and the other second devices.

Figure 8:
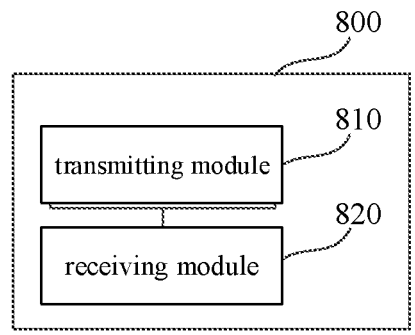
FIG. 8 is a block diagram illustrating an apparatus for resource collision resolution in a V2X direct communication scenario according to another embodiment.

FIG. 8 is a block diagram illustrating an apparatus for resource collision resolution in a V2X direct communication scenario according to another embodiment. The apparatus has the function of realizing the above method embodiments on the second device side, and the function may be realized by hardware, or by hardware executing corresponding software. The apparatus 800 may include a transmitting module 810 and a receiving module 820.

The transmitting module 810 is configured to transmit resource allocation information to a first device, in which the resource allocation information is configured to indicate the resources allocated by the second device for direct communication information transmitted between the first device and the second device.

The receiving module 820 is configured to receive the information transmitted by the first device when executing the resource collision resolution process. The resource collision resolution process is executed when the resources allocated by the second device meet the resource collision condition, in which the resource collision condition includes: there being overlapping resources between the resources allocated by the second device and the resources allocated by other devices.

In summary, in the technical solutions provided by the embodiments of the present disclosure, resource allocation information transmitted by each second device is received by the first device, and whether there is a target second device meeting the resource collision condition is detected according to the resource allocation information. When there is a target second device meeting the resource collision condition, the first device executes the resource collision solution process so as to solve the resource collision problem. With the above method, for the resources that are planned to be occupied in the future in the V2X direct communication scenario, whether there will be a resource collision can be detected, improving the resolution probability of the resource collision and avoiding the occurrence of resource collision to the utmost extent, fully ensuring the success rate of transmitting and receiving information in the V2X direct communication scenario, and facilitating to improve spectrum efficiency.

Alternatively or additionally, the receiving module 820 includes a first receiving submodule. The first receiving submodule is configured to receive resource reallocation information transmitted by the first device, in which the resource reallocation information is configured to instruct the second device to reallocate resources.

Alternatively or additionally, the receiving module 820 includes a second receiving submodule. The second receiving submodule is configured to receive the target direct communication information transmitted by the first device only to the second device on the overlapping resources when the priority of the target direct communication information to be transmitted by the first device to the second device is higher than the priority of other direct communication information to be transmitted by the first device to the other devices.

Alternatively or additionally, the receiving module 820 includes a third receiving submodule. The third receiving submodule is configured to receive multiplexed information transmitted by the first device, in which, the multiplexed information includes: target direct communication information to be transmitted by the first device to the second device, other direct communication information to be transmitted by the first device to the other devices, and identification information of the second device and the other devices.

It is to be noted that, when the apparatus provided by the above embodiments realizes its functions, the division of the above functional modules is used only as an example. In actual applications, the above functions can be allocated to different functional modules according to actual needs. That is, the content structure of the device is divided into different functional modules to complete all or part of the functions described above.

Regarding to the apparatus in the above embodiments, the specific operation methods in which each module performs has been described in detail in the embodiments of the method, and will not be elaborated here.

An apparatus for resource collision resolution in the V2X direct communication scenario is also provided in an embodiment of the present disclosure, which can implement the method for resource collision resolution in the V2X direct communication scenario in the present disclosure. The apparatus may be the first device introduced in the above disclosure, and may also be set in the first device. The apparatus includes a processor, and a memory configured to store instructions executable by the processor. The processor is configured to: receive resource allocation information transmitted by n second devices respectively, in which the resource allocation information is configured to indicate the resources allocated by the second device for direct communication information transmitted between the first device and the second device, in which n is an integer greater than 1; determine the resources allocated by the second device based on the resource allocation information transmitted by the second device; and execute the resource collision resolution process when the resources allocated by a target second device in the n second devices meet the resource collision condition, in which the resource collision condition includes there being overlapping resources between the resources allocated by the target second device and the resources allocated by other second devices.

Alternatively or additionally, the resource collision condition further includes: the proportion of the overlapping resources in resources allocated by the target second device and/or the proportion of the overlapping resources in resources allocated by the other second devices being greater than the threshold.

Alternatively or additionally, the processor is configured to: transmit resource reallocation information to the target second device, in which the resource reallocation information is configured to instruct the target second device to reallocate resources.

Alternatively or additionally, the processor is further configured to: detect whether the target second device meets the resource reallocation condition when the resources allocated by the target second device meet the resource collision condition, in which the resource reallocation condition refers to a preset condition requiring resource reallocation; and transmit the resource reallocation information to the target second device when the target second device meets the resource reallocation condition.

Alternatively or additionally, the resource reallocation condition includes any one or a combination of the following: the proportion of the overlapping resources in resources allocated by the target second device being larger than the proportion of the overlapping resources in resources allocated by the other second devices; the starting time of the time domain resources allocated by the target second device being later than the starting time of the time domain resources allocated by the other second devices; and the priority of the direct communication information transmitted by the resources allocated by the target second device being lower than the priority of the direct communication information transmitted by the resources allocated by the other second devices.

Alternatively or additionally, the resource reallocation information includes identification information of the overlapping resources.

Alternatively or additionally, the direct communication information includes information transmitted by the second device to the first device through a sidelink.

Alternatively or additionally, the direct communication information includes information transmitted by the first device to the second device through a sidelink.

Alternatively or additionally, the processor is further configured to: transmit the target direct communication information only to the target second device on the overlapping resources when the priority of the target direct communication information to be transmitted by the first device to the target second device is higher than the priority of other direct communication information to be transmitted by the first device to the other second devices.

Alternatively or additionally, the processor is further configured to: transmit multiplexed information, in which, the multiplexed information includes: target direct communication information to be transmitted by the first device to the target second device, other direct communication information to be transmitted by the first device to the other second devices, and identification information of the target second device and the other second devices.

An apparatus for resource collision resolution in the V2X direct communication scenario is also provided in an embodiment of the present disclosure, which can implement the method for resource collision resolution in the V2X direct communication scenario in the present disclosure. The apparatus may be the second device introduced in the above disclosure, and may also be set in the second device. The apparatus includes a processor, and a memory configured to store instructions executable by the processor. The processor is configured to: transmit resource allocation information to a first device, in which the resource allocation information is configured to indicate the resources allocated by the second device for direct communication information transmitted between the first device and the second device; and receive information transmitted by the first device when executing a resource collision resolution process, in which the resource collision resolution process is executed when the resources allocated by the second device meet a resource collision condition, and the resource collision condition includes there being overlapping resources between the resources allocated by the second device and the resources allocated by other devices.

Alternatively or additionally, the processor is configured to: receive the resource reallocation information transmitted by the first device, in which the resource reallocation information is configured to instruct the second device to reallocate resources.

Alternatively or additionally, the processor is configured to: receive the target direct communication information transmitted by the first device only to the second device on the overlapping resources when the priority of the target direct communication information to be transmitted by the first device to the second device is higher than the priority of other direct communication information to be transmitted by the first device to the other devices.

Alternatively or additionally, the processor is configured to receive multiplexed information transmitted by the first device, in which, the multiplexed information includes: target direct communication information to be transmitted by the first device to the second device, other direct communication information to be transmitted by the first device to the other devices, and identification information of the second device and the other devices.

From the perspective of the interaction between the first device and the second device, the above introduces methods provided in the embodiments of the present disclosure. It can be understood that the device (including the first device and the second device) includes hardware structures and/or software modules corresponding to execute specific functions with the aim to realize the above functions. Combined with units and algorithm steps of examples of embodiments disclosed in this present disclosure, the embodiments may be realized by hardware or the combination of hardware and computer software. Whether some function is executed by hardware or driving hardware by computer software depends on specific application and design constraints of the technical solution. Those skilled in the art may use different methods for respective specific applications to realize the described functions, but such realization should not be considered as going beyond the scope of the technical solutions of the embodiments of the present disclosure.

Figure 9:
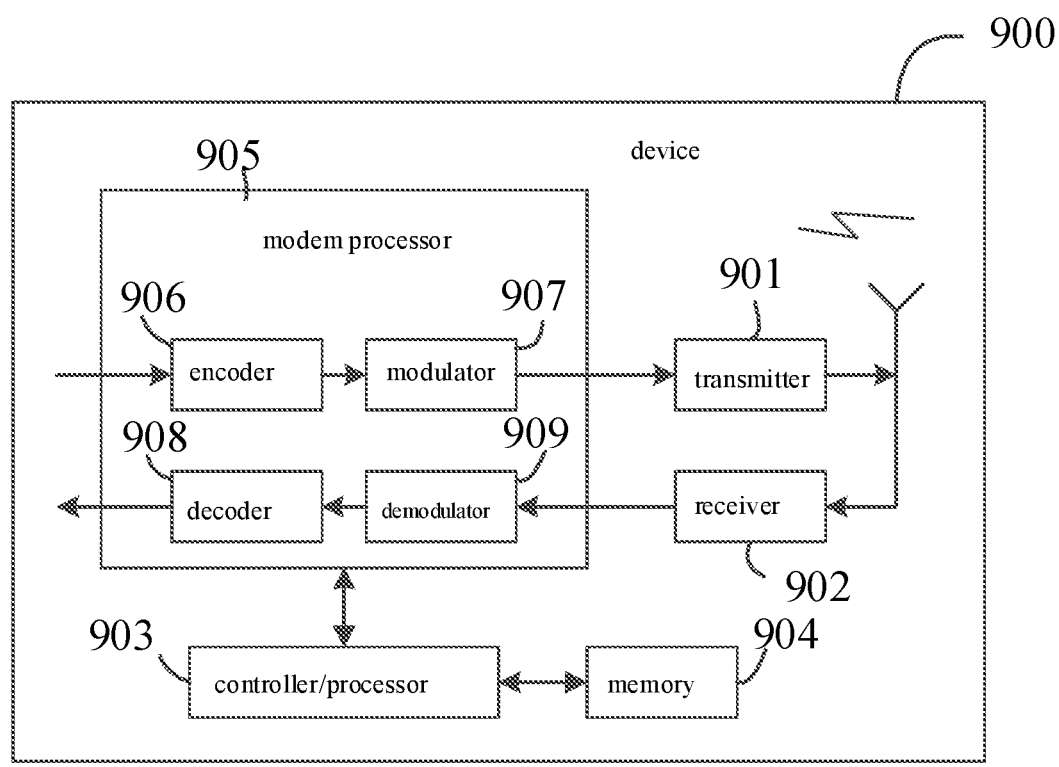
FIG. 9 is a schematic diagram illustrating a device in a V2X direct communication scenario according to an embodiment.

FIG. 9 is a schematic diagram illustrating a device 900 in a V2X direct communication scenario according to an embodiment. The device 900 may be a device for direct communication with other devices in a V2X business scenario, such as on-board devices, terminals and other electronic devices. The device 900 may be the first device or the second device described above.

The device 900 includes a transmitter 901, a receiver 902 and a processor 903. The processor 903 may be a controller, which is represented as a "controller/processor 903" in FIG. 9. Alternatively or additionally, the device 900 may further include a modem processor 905, in which the modem processor 905 may include an encoder 906, a modulator 907, a decoder 908, and a demodulator 909.

In an example, the transmitter 901 adjusts (e.g. performs analog conversion, filter, amplification, and up conversion on) the output samples and generates an uplink signal, which is transmitted to the access network device via an antenna. On the downlink, the antenna receives the downlink signal transmitted by the access network device. The receiver 902 adjusts (e.g. performs filter, amplification, down conversion, digitization on) the signal received from the antenna and provides input samples. In the modem processor 905, the encoder 906 receives business data and signaling messages to be transmitted on the uplink, and processes (e.g. formats, encodes, and interleaves) the business data and signaling messages. The modulator 907 further processes (e.g. performs symbol mapping and modulation on) the encoded business data and signaling messages and provides output samples. The demodulator 909 processes (e.g. demodulates) the input samples and provides symbol estimation. The decoder 908 processes (e.g. deinterleaves and decodes) the symbol estimation and provides decoded data and signaling messages transmitted to the device 900. The encoder 906, the modulator 907, the demodulator 909, and the decoder 908 may be realized by a synthesized modem processor 905. These units are processed according to the wireless access technology adopted by the wireless access network (for example, the access technology of LTE and other evolved systems). It should be noted that when the device 900 does not include the modem processor 905, the above functions of the modem processor 905 may also be realized by the processor 903.

The processor 903 controls and manages the actions of the device 900, and is used to execute the process performed by the device 900 in the above embodiments of the present disclosure. For example, the processor 903 is further configured to execute each step of the transmitting device or the receiving device in the above method embodiments, and/or other steps of the technical solutions described in the embodiments of the present disclosure.

Further, the device 900 may further include a memory 904, in which the memory 904 is configured to store program codes and data for the device 900.

It could be understood that FIG. 9 only illustrates a simplified design of the device 900. In practical applications, the device 900 may include any number of transmitters, receivers, processors, modem processors, memories, and the like, and all devices that can implement the embodiments of the present disclosure are within the protection scope of the embodiments of the present disclosure.

The embodiments of the present disclosure also provide a non-transitory computer-readable storage medium with computer programs stored on. When the computer programs are executed by the device 900, the method for resource collision resolution in the V2X direct communication scenario is implemented as described above.

The technical solutions provided by embodiments of the present disclosure may include the following beneficial effects.

The first device receives resource allocation information transmitted by each second device, detects whether there is a target second device meeting the resource collision condition according to the resource allocation information. When there is a target second device meeting the resource collision condition, the first device executes the resource collision resolution process so as to resolve the resource collision problem. With the above method, for the resources that are planned to be occupied in the future in the V2X direct communication scenario, whether there will be a resource collision can be detected, improving the resolution probability of resource collision, avoiding the occurrence of resource collision to the utmost extent, fully ensuring the success rate of transmitting and receiving information in the V2X direct communication scenario, and facilitating to improve spectrum efficiency. It should be understood that "several" mentioned in this disclosure means two or more than two. "And/or" describes the association of the associated objects, indicating that there can be three types of relationships, for example, A and/or B may mean that, A exists alone, A and B exist at the same time, and B exists alone. The character "/" generally indicates that the associated objects before and after are in an "or" relationship.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It should be understood that the present disclosure is not limited to the precise structure described above and shown in the drawings, and various modifications and changes can be made without departing from its scope. The scope of the claimed invention is only limited by the appended claims.

What is claimed is:

1. A method for resource collision resolution in a V2X direct communication scenario, comprising:
receiving, by a first device, resource allocation information transmitted by n second devices respectively, wherein the resource allocation information transmitted by a second device is configured to indicate resources allocated by the second device for direct communication information transmitted between the first device and the second device, wherein the first device and the second device are terminal devices of a direct communication, where n is an integer greater than 1;
determining, by the first device, the resources allocated by the second device based on the resource allocation information transmitted by the second device; and
executing, by the first device, a resource collision resolution process when the resources allocated by a target second device in the n second devices meet a resource collision condition, wherein the resource collision condition comprises overlapping resources existing between the resources allocated by the target second device and the resources allocated by other second devices;

wherein executing the resource collision resolution process by the first device comprises:
when a priority of target direct communication information corresponding to the target second device is lower than a priority of other direct communication information corresponding to the other second devices, transmitting, by the first device, resource reallocation information to the target second device, wherein the resource reallocation information is configured to instruct the target second device to reallocate resources.

2. The method of claim 1, wherein the resource collision condition further comprises a proportion of the overlapping resources in resources allocated by the target second device and/or a proportion of the overlapping resources in resources allocated by the other second devices being greater than a threshold.

3. The method of claim 1, further comprising:
when the resources allocated by the target second device meet the resource collision condition, detecting by the first device whether the target second device meets a resource reallocation condition, wherein the resource reallocation condition refers to a preset condition requiring resource reallocation; and
when the target second device meets the resource reallocation condition, executing, by the first device, the step of transmitting resource reallocation information to the target second device.

4. The method of claim 3, wherein the resource reallocation condition comprises any one or a combination of:
the proportion of the overlapping resources in resources allocated by the target second device being greater than the proportion of the overlapping resources in resources allocated by the other second devices;
a starting time of time domain resources allocated by the target second device being later than a starting time of time domain resources allocated by the other second devices; and
a priority of direct communication information transmitted by the resources allocated by the target second device being lower than a priority of direct communication information transmitted by the resources allocated by the other second devices.

5. The method of claim 1, wherein the resource reallocation information comprises identification information of the overlapping resources.

6. The method of claim 1, wherein the direct communication information comprises information transmitted by the second device to the first device through a sidelink.

7. The method of claim 1, wherein the direct communication information comprises information transmitted by the first device to the second device through a sidelink.

8. A method for resource collision resolution in a V2X direct communication scenario, comprising:
transmitting, by a second device, resource allocation information to a first device, wherein the resource allocation information is configured to indicate resources allocated by the second device for direct communication information transmitted between the first device and the second device, wherein the first device and the second device are terminal devices of a direct communication; and
receiving, by the second device, information transmitted by the first device when executing a resource collision resolution process, wherein the resource collision resolution process is executed when the resources allocated by the second device meet a resource collision condition, and the resource collision condition comprises overlapping resources existing between the resources allocated by the second device and resources allocated by other devices;
wherein receiving, by the second device, the information transmitted by the first device when executing the resource collision resolution process, comprises:
receiving, by the second device, resource reallocation information transmitted by the first device, wherein the resource reallocation information is configured to instruct the second device to reallocate resources and the resource reallocation information is transmitted by the first device when a priority of target direct communication information corresponding to the target second device is lower than a priority of other direct communication information corresponding to the other second devices.

9. An apparatus for resource collision resolution in a V2X direct communication scenario, applied to a first device, comprising:
a processor; and
a memory configured to store instructions executable by the processor;
wherein the processor is configured to:
receive resource allocation information transmitted by n second devices respectively, wherein the resource allocation information transmitted by a second device is configured to indicate resources allocated by the second device for direct communication information transmitted between the first device and the second device, wherein the first device and the second device are terminal devices of a direct communication, where n is an integer greater than 1;
determine the resources allocated by the second device based on the resource allocation information transmitted by the second device; and
execute a resource collision resolution process when the resources allocated by a target second device in the n second devices meet a resource collision condition, wherein the resource collision condition comprises overlapping resources existing between the resources allocated by the target second device and resources allocated by other second devices;
wherein the processor is configured to:
when a priority of target direct communication information corresponding to the target second device is lower than a priority of other direct communication information corresponding to the other second devices, transmit resource reallocation information to the target second device, wherein the resource reallocation information is configured to instruct the target second device to reallocate resources.

10. An apparatus for resource collision resolution in a V2X direct communication scenario, applied to a second device, and configured to implement the method of claim 8, comprising:
a processor; and
a memory configured to store instructions executable by the processor;
wherein the processor is configured to perform steps of the method of claim 8.

11. The apparatus of claim 9, wherein the processor is further configured to:
detect whether the target second device meets the resource reallocation condition when the resources allocated by the target second device meets the resource collision condition, wherein the resource reallocation condition refers to a preset condition requiring resource reallocation; and transmit the resource reallocation information to the target second device when the target second device meets the resource reallocation condition.

* * * * *